Feb. 1, 1944.   A. S. RICHARDSON ET AL   2,340,691
CONTINUOUS PROCESS FOR FORMING UNSATURATED ALCOHOLS AND ESTERS
Filed Oct. 13, 1943    2 Sheets-Sheet 1
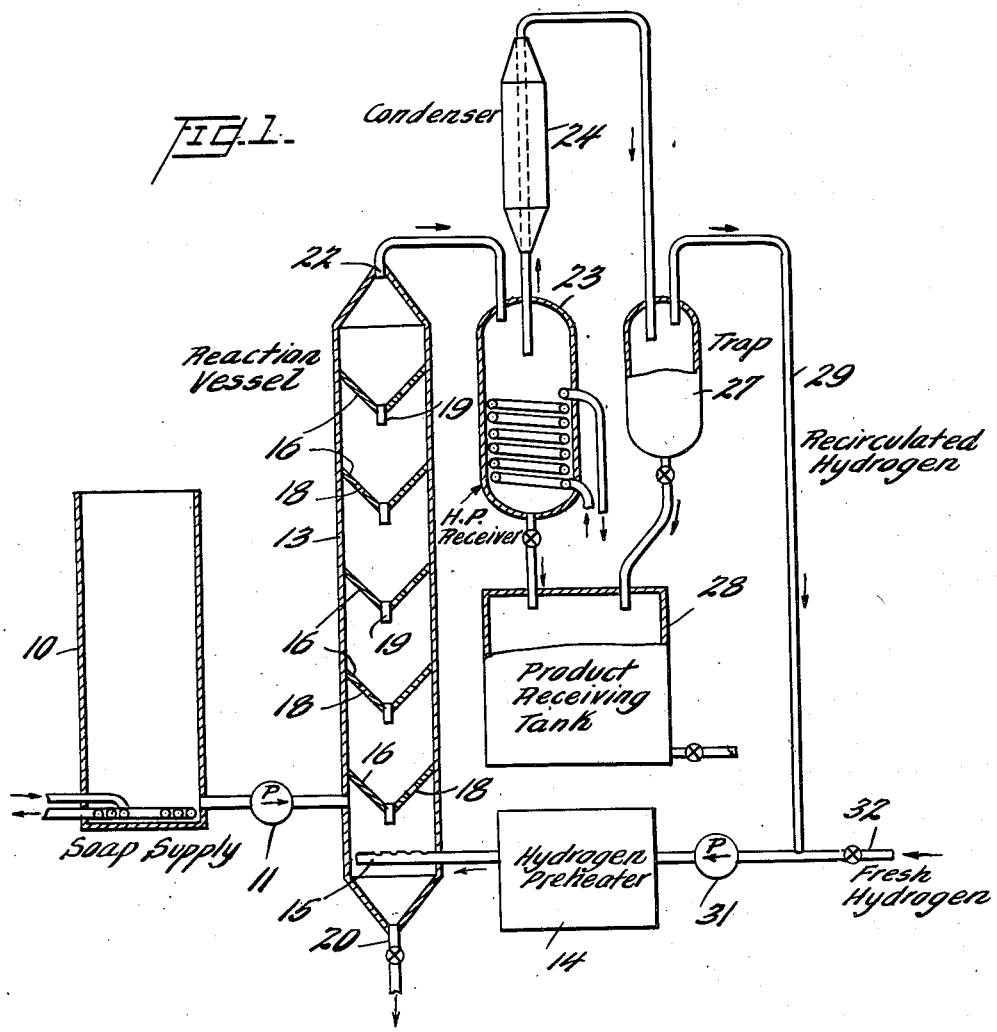
Inventor
ALBERT S. RICHARDSON
JAMES E. TAYLOR

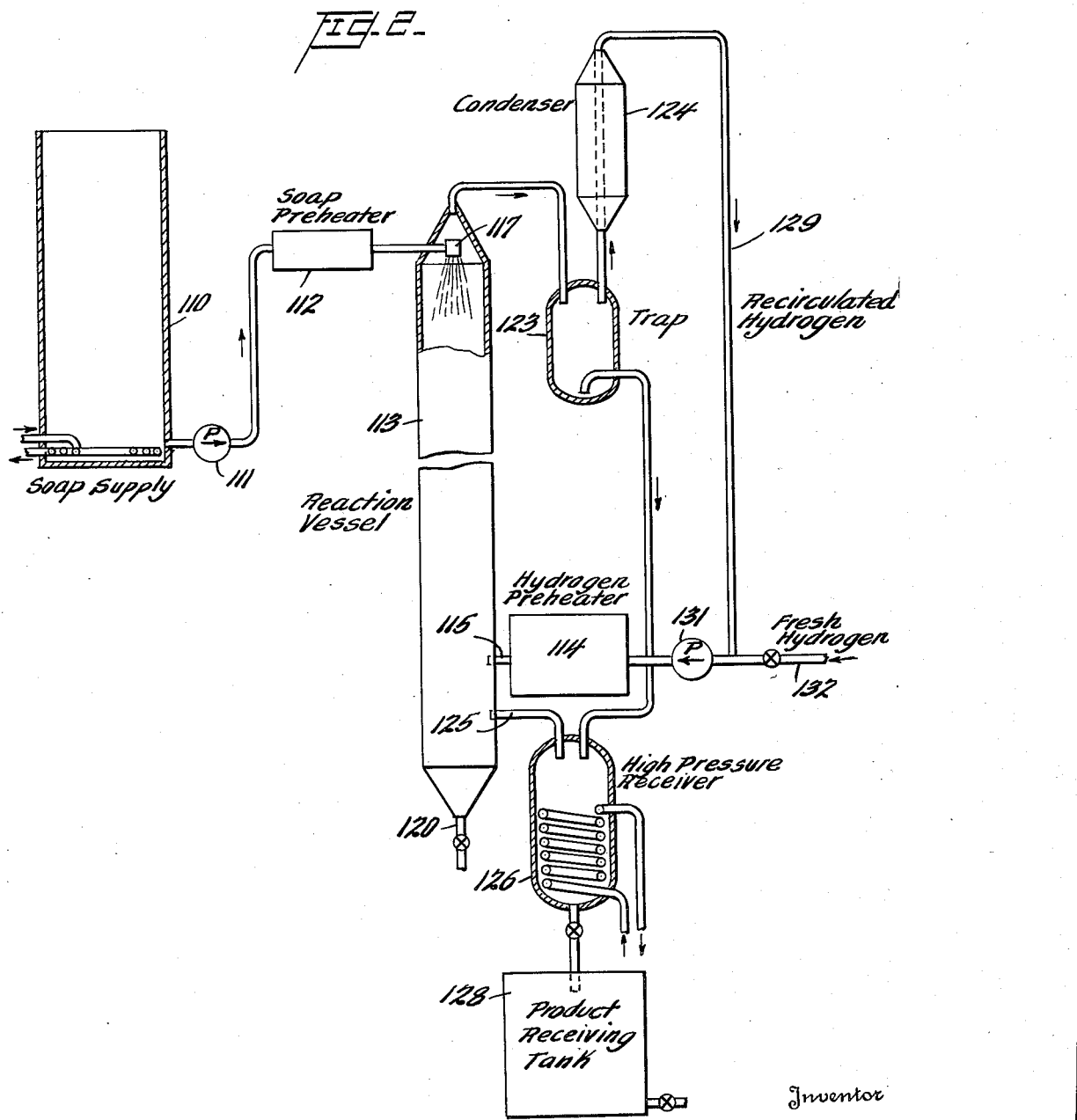

Patented Feb. 1, 1944

2,340,691

UNITED STATES PATENT OFFICE 2,340,691

CONTINUOUS PROCESS FOR FORMING UNSATURATED ALCOHOLS AND ESTERS

Albert S. Richardson, Wyoming, Ohio, and James E. Taylor, Louisville, Ky., assignors to The Procter and Gamble Company, Ivorydale, Ohio, a corporation of Ohio Application October 13, 1943, Serial No. 506,108

17 Claims. (Cl. 260—410.9)

This invention relates to a process for forming unsaturated alcohols, or unsaturated esters, or both, by reacting hydrogen with certain metallic salts of unsaturated carboxylic acids.

More particularly, it relates to continuous operation of this basic process.

This process converts a salt of a carboxylic acid, which may be represented as $(R \cdot CO \cdot O)_x M$, where R is an organic radical containing at least one carbon to carbon double bond, M is a metallic radical of a group which will be defined, and $x$ is a small whole number, into the corresponding unsaturated alcohol which may be represented as $R \cdot CH_2 \cdot OH$. These reactants may react with another molecule of the salt or with the acid radical of this salt to form the corresponding ester, which may be represented as $R \cdot CO \cdot O \cdot CH_2 \cdot R$.

This application is a continuation-in-part of our application Serial No. 380,073 which was filed February 21, 1941. That application describes processes comprising the high temperature and high pressure hydrogenation of certain unsaturated metallic carboxylates to form the corresponding unsaturated alcohols and/or esters of these alcohols with the corresponding fatty acids. The mode of operation specifically described in the aforementioned application is a batch process which is often not as desirable for large scale commercial application as would be a continuous process.

An object of our invention is to reduce metallic salts of unsaturated carboxylic acids to the corresponding unsaturated alcohols, and/or esters thereof, in a continuous process suitable for economical commercial practice.

A further and more specific object of our invention is to reduce lead soaps of the higher unsaturated fatty acids to unsaturated fatty alcohols in a continuous manner.

Other objects will be apparent from the following disclosure of the invention.

Unsaturated mixtures of alcohols or esters, or both, suitable for use in the manufacture or synthesis of detergents, of emulsifying or wetting agents, or plasticizing agents, of waxes, of drying compositions, and the like, may be formed by this process from unsaturated mixtures of fatty acids derived from naturally occurring fatty oils, from rosin, from oxidation of petroleum products, or from other sources. Primary aromatic alcohols and their esters may also be made by our process.

Raw materials for the process, and uses for the resulting alcohols and esters, are so numerous and varied that our invention will find application in the preparation of many products other than those specifically named herein.

In this specification the term "corresponding" is used to denote a similarity of the R groups of an alcohol, $R \cdot CH_2 \cdot OH$, or of its ester, $R \cdot CO \cdot O \cdot CH_2 R$, and of the carboxylic acid, $R \cdot CO \cdot OH$, from which these are derived. The term "residue" is used to denote the

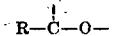

group of an acid, alcohol, or ester.

Previously described methods for making unsaturated alcohols or unsaturated esters which depend upon a hydrogenation step have given disappointing results. Our present process, which does not depend upon the employment of a catalyst, differs greatly from earlier methods and is well adapted to convert salts of unsaturated acids into unsaturated alcohols or esters with little or no simultaneous saturation of double carbon bonds. The ability of our method to accomplish this conversion rapidly is one of its principal advantages over prior methods. As a result of the relatively high reaction rate of our process under normally preferred conditions, it may be practiced in a continuous manner on a commercial scale with equipment which is relatively small and inexpensive in proportion to its production capacity, with consequent economic advantages.

In a related copending application, Serial Number 504,946, filed Oct. 4, 1943, we have described a continuous process for forming alcohols or esters thereof by continuously bringing carboxylates of certain metals, including those of lead and cadmium, into contact with hydrogen at elevated temperature and pressure. This process converts the carboxylic group, —CO—O—, of the acid radical into the group —CH_2—O—, which is present both in the alcohol and in the ester.

The invention to which the present application is more particularly directed is based on our discovery that unsaturated alcohols, or esters of these alcohols, may be formed continuously when salts whose acid radicals are carboxylic acids containing double carbon bonds, and whose basic radicals comprise certain metals, are continuously brought into contact with hydrogen at relatively high temperature and pressure.

When lead carboxylates are subjected to our process, relatively high yields of primary alcohols corresponding to the acid radicals of the carboxylate are obtained. Esters of these alcohols are also formed, usually in lesser amounts. Hydrogenation of double carbon bonds does not occur to a substantial extent when lead carboxylates are thus hydrogenated, and consequently unsaturated alcohols, and lesser amounts of unsaturated esters, may be produced from lead salts of unsaturated carboxylic acids.

When cadmium carboxylates are subjected to our process relatively high yields of esters are obtained, these esters having alcohol and acid residues corresponding to the acid radicals of the carboxylates. The reaction products may also include the corresponding alcohols, usually in relatively small amounts, especially if carboxylates of other metals than cadmium are absent. Hydrogenation of double carbon bonds does not occur to a substantial extent when cadmium carboxylates are thus hydrogenated, and consequently unsaturated esters and lesser amounts of unsaturated alcohols may be produced from cadmium salts of unsaturated acids.

We have also found that when mixtures of carboxylates, the metallic constituent of which includes two or more metals, are subjected to our process, the percentage conversion of the —CO—O— group to the —CH$_2$—O— group is often higher than the conversion obtainable under comparable conditions with carboxylates of any one of the individual metals; furthermore, that the relative proportions of alcohols and esters produced, and the relative extent of concurrent saturation of unsaturated carbon bonds, are not readily predictable from a knowledge of the results obtained when carboxylates of the several metals of the mixture are hydrogenated individually. Mixtures of carboxylates of copper and cadmium, or cadmium and nickel, for example, give high yields of alcohols and relatively lower yields of esters, and if the carboxylates are unsaturated the resulting products tend to be unsaturated to approximately the same degree.

When carried out under the preferred conditions herein described, the alcohol residue and acid residue of the ester produced by the process are those which correspond to the carboxylic acid in number of carbon atoms and configuration of carbon chains and substituent groups. When the reaction mixture includes salts of more than one carboxylic acid mixed esters may result. It is our belief that the partial hydrogenation of the carboxylic group in the salt to form the corresponding alcohol is the primary reaction, and that the formation of ester is a subsequent and secondary reaction.

Under preferred conditions of our process the degree to which saturation with hydrogen of double carbon bonds occurs is relatively small, seldom exceeding about fifteen or twenty per cent as calculated from change in iodine value.

In preparing to carry out our process we first obtain the salt of the carboxylic acid and of the chosen metal in any convenient way.

Metallic carboxylates may, for example, be formed in many cases by reacting the carboxylic acid with an oxide, hydroxide, carbonate, or other salt of the metal. A salt-forming procedure that is generally applicable for making water-insoluble carboxylates is to mix two aqueous solutions containing equivalent amounts, respectively, of the soluble sodium salt of the carboxylic acid (which may be made by reacting the carboxylic acid, or a glyceride or other ester of this acid, with an aqueous solution of sodium hydroxide), and of a water soluble inorganic salt of the metal. Thus we produce a precipitate of the desired carboxylate, which we then separate from the remaining solution and wash and dry, this salt in some cases being a basic rather than a normal salt.

Another method of making metallic carboxylates, which is especially convenient when the carboxylic acids are higher fatty acids, consists in saponifying triglycerides or other esters of the fatty acids with an oxide or hydroxide of a metal. Litharge, for example, may be agitated and heated with naturally occurring triglycerides by blowing a current of steam through this mixture, thus forming lead soaps of the fatty acids of the glycerides.

To carry out the essential steps of our continuous process, we introduce a continuous supply of the metallic carboxylic salt, in molten condition, and an adequate excess of hydrogen gas into a suitable reaction vessel wherein the reactants are maintained at a high temperature and under a high hydrogen pressure as hereinafter more fully explained, and wherein intimate contact between the gas and the liquids is brought about, and we continuously remove products of the reaction from another part or parts of the reaction vessel.

Instead of employing a single salt of a carboxylic acid, a mixture of a number of salts may be employed, comprising a plurality of metals or a plurality of carboxylic acids or a plurality of both.

Preferred conditions for our process include the maintenance of a temperature in the reaction zone between about 240° C. and about 400° C. and a pressure in excess of 2000 pounds per square inch. The alcohol and ester forming reactions occur, although more slowly, at temperatures below 240° C., down to 180° C. at least. Likewise these reactions have been observed under suitable temperature conditions at pressures as low as 500 pounds per square inch. When high yields of alcohols are desired, when operating continuously with a relatively small reaction vessel, we prefer to conduct the process at about 300° C. to 400° C. and at a hydrogen pressure of at least 3000 pounds, and even more desirably at about 4000 pounds per square inch. When the carboxylates are those of a metal, or of a mixture of metals which forms an alloy, which melts below 400° C., we prefer to carry out the reaction at a temperature above the melting point of the metal or alloy. The most favorable temperature and pressure conditions cannot be more definitely stated because they vary with different carboxylates. It is well known that carboxylates vary in their stability at elevated temperature, and it is of course preferable to choose a reaction temperature for each carboxylate such that side reactions due to pyrolysis are not excessive.

Usually, especially when the object is to form alcohols in preference to esters, gaseous hydrogen is supplied to the organic salt undergoing reaction not only in amounts adequate for the reaction, which is 5 mols of hydrogen per 2 mols of carboxylic group for alcohol formation, or 3 mols of hydrogen per 2 mols of carboxylic group for ester formation, but also in a sufficient excess so that throughout the reaction there will be a relative preponderance of unreacted hydrogen as compared with water vapor and, especially when certain forms of reactors are used, so that the flow of hydrogen will aid in agitating the liquid reactants to promote intimate contact between the liquid and gaseous phases.

When the object is to form esters in preference to alcohols it is sometimes expedient to hydrogenate a mixture consisting of a metallic carboxylic salt and the corresponding free carboxylic acid, this mixture containing relatively more mols of salt than of free acid, instead of hydrogenating the salt alone.

In operating our continuous process, we find it preferable to preheat the supply of hydrogen to approximately the desired reaction temperature or even higher, and we also prefer to preheat the metallic carboxylates, at least to a moderate extent. Inasmuch as many of these carboxylates tend to decompose if held at the preferred reaction temperature of our process it is best, if they are to be fully preheated, to perform this step in a continuous and rapid manner immediately prior to the introduction of the carboxylates into the reaction chamber. When a flow of hydrogen in great excess is employed, it is possible to preheat the incoming hydrogen to so high a temperature that the carboxylates need not be heated more than enough to make them readily pumpable, and that no additional source of heat is required.

Although the reaction is a rapid one, we consider it important to make positive provisions for exposing the organic liquid reactants repeatedly to contact with the gaseous hydrogen while avoiding eddy currents in the liquid phase such as would transfer a significant proportion of the incoming carboxylates to the outlet of the reaction chamber before they have time to react with the hydrogen. Mechanical agitation may be used to promote mixing of the liquid and gaseous phases, but, because of the difficulty of providing such agitation under the very high pressures prevailing in the reaction zone, we prefer to bring about the necessary intimate contact between the two phases through the agency of the flow of either the one or the other or both of the principal reactants themselves. These conditions of mixing or contacting the gaseous and the organic liquid phase intimately and repeatedly, and of preventing excessive contamination of the outgoing reaction products with unreacted carboxylate, as well as other conditions which are peculiar to this process, may, we find, be satisfied in several different forms of reaction vessel. Among these are: a multi-stage reactor having compartments through which the hydrogen flows successively, entering each compartment near the bottom, while the liquid reaction mass flows in a general direction either concurrent with, or countercurrent to, the flow of the hydrogen; a reactor having vertical or sloping surfaces down which the liquid reactants flow in thin films, in contact with an atmosphere of hydrogen; and a reactor in which a finely divided spray of the carboxylate may be caused to fall through an atmosphere of hydrogen. Additional forms of reaction vessel which meet the essential requirements are obviously adaptable to use with our process.

The drawings illustrate schematically two forms of apparatus which are suitable for carrying out our process under advantageous conditions.

Figure 1 represents a form of apparatus in which turbulence in the liquid phase is caused by the upward flow of hydrogen therethrough and in which objectionable eddy currents are restricted by funnel-shaped baffles or partitions.

Figure 2 represents a form of apparatus in which the liquid reactants are caused to flow downward, in attenuated form, through an atmosphere of hydrogen.

In either form of apparatus the soap pump, reaction vessel, condenser, high pressure receiver and trap, hydrogen pump and preheater, pipe lines, and other parts of the equipment in which high pressures are maintained, are designed to withhold safely an internal pressure of at least 5000 pounds per square inch, and they are preferably well lagged with heat insulating material. The main reaction vessel is provided with some suitable heating means, unless provisions are made to preheat one or both of the incoming raw materials to a sufficient extent to provide all the heat required in the reactor.

*Example 1.*—As an example of the practice of our process with the apparatus illustrated in Figure 1, we will describe a typical operation in which lead soaps of commercial oleic acid are reduced to the corresponding oleyl alcohol.

The lead oleate may be prepared by mechanically agitating a mixture of oleic acid and litharge, in proportions equivalent to normal lead soaps, at a temperature of about 120° C. to 140° C., until the yellow color of the litharge has substantially disappeared. The resulting soaps are settled until clear and decanted from whatever insoluble matter may have dropped out.

These lead soaps, which may be melted conveniently by means of high pressure steam in a closed coil in supply tank 10, and maintained in this tank at a temperature of about 150° C., are transferred by means of high pressure pump 11 into the lowest compartment of the enclosed multi-stage reaction vessel 13, in which they are heated to about 345° C. by heating coils or a heating jacket (not shown) or by contact with sufficiently hot incoming hydrogen. A flow of hydrogen gas is continuously supplied through preheater 14 and the perforated distributing element 15 below the surface of the lead soaps in this same compartment of the reaction vessel. The hydrogen enters the reaction vessel at a temperature which usually ranges from about 340° C. to about 450° C., depending on whether the hydrogen is or is not the principal agency for supplying heat to the reactor contents. The lead soaps and the alcohols formed by the reaction, and also the hydrogen, move upwardly through the reaction vessel, passing successively from one compartment to the other. The funnel shaped baffles or partitions 16, which divide the reaction vessel into compartments, are each provided with an opening 18, as well as with a central opening 19, as shown, to permit the passage of materials from one compartment to the other. These partitions serve to prevent eddy currents such as would sweep some portions of the incoming lead soaps to the outlet at the top of the vessel before they had adequate opportunity to come into contact with hydrogen. The volumetric rate of hydrogen flow through the reaction vessel is preferably in the order of 15 to 30 times the volumetric rate of liquid flow through this vessel, and as a result effective mixing of the organic liquid and the gaseous phase is brought about in each compartment of the reactor. We find that two to three compartments in the reaction vessel are sufficient for reasonably satisfactory results but we prefer to provide at least four or five of these compartments.

Molten metallic lead is liberated as a result of the reaction, and because of its great density it settles to the bottom of the reaction vessel, passing from upper compartments through baffle openings 19, and collects in a pool at the bottom. It is withdrawn either continuously or periodically through the bottom outlet 20 of the reaction vessel. It may either be collected in molds for cooling in solid pig form, or it may be sprayed into a tower for solidification in finely divided form or for oxidation to lead oxide, suitable for reuse in making more lead soap.

The organic liquid reaction products and the unreacted excess of hydrogen, together with vaporized fatty alcohols and water vapor formed by the reaction, pass out of the upper part of the reaction vessel through outlet 22 into high pressure receiver 23. The gaseous materials pass into condenser 24 in which vaporized alcohols and most of the water are condensed, thence through trap 27. Condensate collecting in receiver 23 and trap 27 are drained, either periodically or continuously, into low pressure product receiving tank 28. The hot reaction products which collect in receiver 23 may be cooled by means of cooling coils within this receiver (as indicated in Fig. 1), or by passing through a cooler on their way to tank 28, or by flash evaporation of the water they contain as they are released to atmospheric pressure.

The excess of hydrogen is normally recirculated through a return line 29 by means of pump 31. This recirculated hydrogen is augmented by the addition of fresh hydrogen from a high pressure hydrogen supply, indicated at 32, which is maintained under a pressure of 4000 pounds per square inch or higher. The rate of introduction of fresh hydrogen from supply 32 is regulated so as to maintain the desired operating pressure of about 4000 pounds per square inch in the hydrogenating system.

Hydrogen pump 31 is operated at a speed, in relation to its capacity per revolution or per stroke, sufficient to provide a volume rate of hydrogen to the reaction vessel which may suitably be about 22 times the volume rate of the incoming molten lead soaps. This corresponds to a hydrogen supply about 15 times that theoretically required to reduce the lead soaps.

With a small reaction vessel, having an internal diameter of 1.6 inches and a height of 31 inches, and divided into five compartments, good yields of crude oleyl alcohol, having an iodine value of 85, are obtainable with a soap input rate of 5.3 pounds per hour, and a hydrogen rate of 2.22 cubic feet per hour measured at 3900 pounds per square inch pressure and at 345° C.

Example 2.—Another example of our process, employing a different form of apparatus, is the formation of alcohols, predominantly unsaturated, corresponding to the fatty acid radicals of soya bean oil, by pumping preheated lead soaps of these fatty acids in finely divided spray form, into the upper part of a tall vertical reaction vessel in which an atmosphere of hydrogen at 3000 to 4000 pounds per square inch pressure is maintained. For this purpose apparatus corresponding to that illustrated in Figure 2 may be employed. This differs from the apparatus of Figure 1 chiefly in that the tall spray chamber 113 is employed as the reaction vessel, and the flow of carboxylates is downward instead of upward.

The lead soaps are melted in tank 110, transferred thence by pump 111 through preheater 112 to spray nozzle 117, from which the hot soap issues in atomized form and falls down through the atmosphere of hydrogen which is maintained in reaction chamber 113.

The flow of hydrogen is generally similar to its flow in the apparatus of Fig. 1, i. e., from supply 132 and return line 129 the hydrogen is forced by pump 131 through preheater 114 into the lower part of chamber 113 through inlet 115. The outlet gases leave chamber 113 through outlet 122, passing thence through trap 123 and condenser 124 to return line 129. The volume rate of hydrogen flow through the reaction vessel of Fig. 2 may be much lower than the preferred rate through the reactor of Fig. 1.

Liquid organic reaction products leave the reaction chamber through outlet 125 and drain into high pressure receiver 126, which may be provided with a cooling coil as shown. Vaporized reaction products which condense in condenser 124 also drain into receiver 126. From this receiver the liquid products are withdrawn into low pressure receiving tank 128. Molten lead is withdrawn from the reaction chamber through bottom outlet 120.

Other examples of our process are:

Example 3.—The production of the ester, $C_{15}H_{29}COOCH_2C_{15}H_{29}$, by pumping the cadmium soap of the acid $C_{15}H_{29}COOH$ at a rate of about 5 pounds per hour into the reaction vessel described in Example 1, introducing preheated hydrogen at 3000 pounds per square inch pressure and at a volume rate of 1 cubic foot per hour, measured under the conditions existing in the reaction vessel, and maintaining a temperature of about 340° C. in the vessel.

Example 4.—The production of benzyl alcohol by continuously pumping lead benzoate into a reaction vessel of the type described in Example 1, introducing a large excess of preheated hydrogen at 4000 pounds per square inch pressure, and maintaining a temperature of about 340° C. in the vessel.

In addition to the processing conditions previously referred to in the general discussion and specific examples of our process, it may be said that favorable results are most easily obtained by employing carboxylates of a metal, or of a mixture of metals which forms an alloy, having a melting point below 400° C. (and, as previously mentioned, maintaining the reaction temperature above this melting point); also, by employing conditions of temperature, pressure, and gas-liquid contact such that free metal is liberated sufficiently rapidly and in sufficient concentration to permit rapid fusing together of the individual droplets, thus minimizing the formation of troublesome emulsions of the metal in the organic liquid phase; also, the avoidance of thermal decomposition of the carboxylates entering the process and of the organic reaction products, by keeping the time that these materials are maintained at the high reaction temperature to a very minimum.

It is to be understood that our process is not limited to the reactants or types of reaction chambers mentioned in the foregoing specific examples. The process is generally applicalbe, and moderate to good product yields are obtainable with carboxylates (comprising those of the preferred metals) which are sufficiently thermostable under conditions favorable to rapid reaction. We have found that continuous operation of this process becomes feasible, either (1) when an excess of hydrogen is caused to flow with a continuously supplied mass of the carboxylate, under conditions such as to cause turbulence in the mass—as by bubbling the gas through the liquid, or flowing the gas over the liquid under conditions of turbulence—in either case restricting eddy currents which would contaminate the organic products with unchanged carboxylates; or (2) when a continuous flow of the carboxylate in attenuated form (by which we mean in thin films or small droplets) is passed through an atmosphere of hydrogen.

Our process is capable of application to many varied raw materials to produce many useful products. Unsaturated fatty alcohols having at least eight carbon atoms, which may be sulfated or sulfonated for use in detergents or wetting agents or emulsifying agents, may for example be made from unsaturated fatty oils or their fatty acids.

This process may also be employed to form an unsaturated mixture of alcohols or esters or both from rosin acids, or from mixtures of rosin acids and fatty acids. These products, and also unsaturated alcohols and unsaturated esters made by our process from fatty acids derived from drying oils, may be used in the preparation of improved drying compositions for use in paint, varnish, and related products.

Another use for this process is in the manufacture of synthetic waxes, composed principally or entirely of esters of fatty acids and high molecular weight alcohols. Convenient raw materials for use in making synthetic waxes are fatty acids derived from glyceride oils and rosin acids.

Having thus described our invention, what we claim and desire to secure by Letters Patent is:

1. The process which comprises flowing hydrogen and a salt of an unsaturated carboxylic acid and of a metal selected from the group consisting of lead and cadmium, continuously into a reaction chamber, without added catalyst, and maintaining within said chamber a reaction temperature and hydrogen pressure sufficiently above atmospheric to effect substantial reduction of the carboxylic group, —CO—O—, of said salt to the group, —CH₂—O—, with resulting formation of a reaction product of the class consisting of unsaturated primary alcohol and ester thereof, and continuously removing products of said reaction from the reaction chamber.

2. In the process of forming unsaturated reaction products the step which consists essentially in subjecting metallic salts of unsaturated carboxylic acids to contact with hydrogen at a temperature between about 300° C. and about 400° C. and under a pressure between about 3000 and about 4000 pounds per square inch, the metal of said salts being selected from the group consisting of lead and cadmium, said step being conducted in a continuous manner by continuously introducing said salts, in molten condition, into an enclosed reaction zone, maintaining in said zone an atmosphere of hydrogen at said pressure, bringing about intimate contact between hydrogen and salts in said zone by the flow therethrough of at least one of said reactants, and continuously removing from said zone products of said reaction and unreacted hydrogen.

3. The process of forming reaction products of the group consisting of unsaturated primary fatty alcohols and unsaturated esters of said alcohols which comprises reacting hydrogen, under elevated temperature and pressure, and without added catalyst, with molten soaps of corresponding unsaturated fatty acids derived from natural animal and vegetable sources, the metals of said soaps including a substantial proportion of a metal selected from the group consisting of lead and cadmium, said reaction being conducted in a continuous manner by continuously introducing said soaps into an enclosed reaction zone, maintaining in said zone an atmosphere of hydrogen at said pressure, bringing about intimate contact between hydrogen and soaps in said zone by the flow therethrough of at least one of said reactants, and continuously removing from said zone products of said reaction and unreacted hydrogen.

4. The process of forming reaction products of the group consisting of a primary alcohol of the series $C_nH_{(2n-x)}CH_2OH$ and the corresponding ester of the series $$C_nH_{(2n-x)}COOCH_2C_nH_{(2n-x)}$$

which comprises reacting hydrogen, without added catalyst, with a metallic salt of the corresponding carboxylic acid of the series $C_nH_{(2n-x)}COOH$, where $x$ is one of the numbers 1, 3, 5, and 7, at a temperature between about 240° and about 400° C. and at a pressure above 2000 pounds per square inch, the metal of said salt being selected from the group consisting of lead and cadmium, said hydrogenation being conducted in a continuous manner by continuously introducing said salt, in molten condition, into an enclosed reaction zone, maintaining in said zone an atmosphere of hydrogen at said pressure, bringing about intimate contact between hydrogen and metallic salt in said zone by the flow therethrough of at least one of said reactants, and continuously removing from said zone products of said reaction and unreacted hydrogen.

5. The process which comprises subjecting to reaction with hydrogen, without added catalyst, a salt of an aromatic carboxylic acid and of a metal selected from the group consisting of lead and cadmium, the reaction temperature and hydrogen pressure being sufficiently above atmospheric to effect substantial reduction of the carboxylic group, —CO—O—, of said salt to the group, —CH₂—O—, with resulting formation of a reaction product of the class consisting of unsaturated primary alcohol and ester thereof, said reaction being conducted in a continuous manner by continuously introducing said salts, in molten condition, into an enclosed reaction zone, maintaining in said zone an atmosphere of hydrogen at said pressure, bringing about intimate contact between hydrogen and salts in said zone by the flow therethrough of at least one of said reactants, and continuously removing from said zone products of said reaction and unreacted hydrogen.

6. The process of forming unsaturated reaction products of the group consisting of primary alcohol and ester of said alcohol which comprises reacting hydrogen at elevated temperature and pressure with a lead salt of the unsaturated carboxylic acid corresponding to said alcohol, said reaction being conducted in a continuous manner by continuously introducing said lead salt, in molten condition, into an enclosed reaction zone, maintaining in said zone an atmosphere of hydrogen at said pressure, bringing about intimate contact between hydrogen and lead salt in said zone by the flow therethrough of at least one of said reactants, and continuously removing from said zone products of said reaction and unreacted hydrogen.

7. The process of forming unsaturated reaction products of the group consisting of primary fatty alcohol and ester of said alcohol which comprises reacting hydrogen at elevated temperature and pressure with a lead soap of the unsaturated fatty acid corresponding to said alcohol, said reaction being conducted in a continuous manner by continuously introducing said lead soap, in molten condition, into an enclosed reaction zone, maintaining in said zone an atmosphere of hydrogen at said pressure, bringing about intimate contact between hydrogen and lead soap in said zone by the flow therethrough of at least one of said reactants, and continuously removing from said zone products of said reaction and unreacted hydrogen.

8. The process of forming unsaturated reaction products of the group consisting of primary fatty alcohol and ester of said alcohol which comprises reacting hydrogen at elevated temperature and pressure with a lead soap of the unsaturated fatty acid corresponding to said alcohol, said reaction being conducted in a continuous manner by: introducing a continuous supply of said lead soap, in a molten condition, into a reaction chamber and maintaining said soap at said reaction temperature; continuously introducing an excess of hydrogen into said chamber at said pressure, and flowing said hydrogen in intimate contact with said soap to cause turbulence therein; preventing excessive contamination of the outgoing organic reaction products with unreacted soap by restricting eddy currents in the liquid reactants; removing non-metallic products of said reaction from a portion of said chamber that is remote from the soap inlet; continuously removing the unreacted excess of hydrogen after its passage in contact with said molten soap; and removing from the lower part of said chamber metallic lead resulting from said reaction.

9. The process of forming unsaturated reaction products of the group consisting of primary fatty alcohol and ester of said alcohol which comprises reacting hydrogen at elevated temperature and pressure with a lead soap of the unsaturated fatty acid corresponding to said alcohol, said reaction being conducted in a continuous manner by: continuously passing said lead soap, at said reaction temperature and in attenuated form, downwardly through an enclosed reaction chamber; maintaining in said chamber in contact with said lead soap an atmosphere of hydrogen at said pressure; and removing liquid reaction products from the lower part of said chamber.

10. The process of forming unsaturated reaction products of the group consisting of primary fatty alcohol and ester of said alcohol which comprises reacting hydrogen at elevated temperature and pressure with a lead soap of the unsaturated fatty acid corresponding to said alcohol, said reaction being conducted in a continuous manner by flowing said lead soap, in a continuous stream, and an excess of hydrogen into the lowest compartment of a multi-compartment reaction chamber, passing said reactants and non-metallic reaction products thereof upwardly through said compartment and through a restricted passage into another compartment of said chamber, removing from the uppermost compartment of said chamber non-metallic products of said reaction and the unreacted excess of hydrogen, and removing from the lower part of said chamber metallic lead resulting from said reaction.

11. The process of claim 7, conducted at a reaction temperature higher than the melting point of lead and at a hydrogen pressure in excess of 3000 pounds per square inch, and in which the unsaturated fatty acid is one having at least eight carbon atoms.

12. The process of claim 8, conducted at a reaction temperature higher than the melting point of lead and at a hydrogen pressure in excess of 3000 pounds per square inch, and in which the unsaturated fatty acid is one having at least eight carbon atoms.

13. The process of claim 9, conducted at a reaction temperature higher than the melting point of lead and at a hydrogen pressure in excess of 3000 pounds per square inch, and in which the unsaturated fatty acid is one having at least eight carbon atoms.

14. The process of claim 10, conducted at a reaction temperature higher than the melting point of lead and at a hydrogen pressure in excess of 3000 pounds per square inch, and in which the unsaturated fatty acid is one having at least eight carbon atoms.

15. The process which comprises subjecting to reaction with hydrogen, without added catalyst, a salt of an unsaturated carboxylic acid and of a metal selected from the group consisting of lead and cadmium, the reaction temperature and hydrogen pressure being sufficiently above atmospheric to effect substantial reduction of the carboxylic group, —CO—O—, of said salt to the group, —CH$_2$—O—, with resulting formation of a reaction product of the class consisting of unsaturated primary alcohol and ester thereof, said reaction being conducted in a continuous manner by flowing said salt, in a continuous stream, and an excess of hydrogen into the lowest compartment of a multi-compartment reaction chamber, passing said reactants and non-metallic reaction products thereof upwardly through said compartment and through a restricted passage into another compartment of said chamber, removing from the uppermost compartment of said chamber non-metallic products of said reaction and the unreacted excess of hydrogen, and removing from the lower part of said chamber free metal resulting from said reaction.

16. The process which comprises flowing hydrogen and a salt of an unsaturated carboxylic acid and of a metal selected from the group consisting of lead and cadmium, continuously into a reaction chamber, without added catalyst, and maintaining within said chamber a reaction temperature and hydrogen pressure sufficiently above atmospheric to effect substantial reduction of the carboxylic group, —CO—O—, of said salt to the group, —CH$_2$—O—, with resulting formation of a product of the class consisting of unsaturated primary alcohol and ester thereof, imparting relative movement within said chamber to the hydrogen and salt reactants, and continuously removing products of said reaction from the reaction chamber while retarding movement of unreacted salt through and out of said chamber to minimize contamination therewith of the removed products.

17. The process which comprises flowing hydrogen and, at a materially less volumetric rate, a salt of an unsaturated carboxylic acid and of a metal selected from the group consisting of lead and cadmium, continuously into one portion of a reaction chamber, without added catalyst, and maintaining within said chamber a reaction temperature and hydrogen pressure sufficiently above atmospheric to effect substantial reduction of the carboxylic group, —CO—O—, of said salt to the group, —CH$_2$—O—, with resulting formation of a product of the class consisting of unsaturated primary alcohol and ester thereof, and continuously removing products of said reaction from another portion of the reaction chamber.

ALBERT S. RICHARDSON.
JAMES E. TAYLOR.